United States Patent
Lei et al.

(10) Patent No.: US 9,503,951 B2
(45) Date of Patent: Nov. 22, 2016

(54) METHOD AND APPARATUS FOR SWITCH

(75) Inventors: Yixue Lei, Beijing (CN); Xiang Xu, Nanjing (CN)

(73) Assignee: Nokia Technologies Oy, Espoo (FI)

( * ) Notice: Subject to any disclaimer, the term of this patent is extended or adjusted under 35 U.S.C. 154(b) by 63 days.

(21) Appl. No.: 14/397,954

(22) PCT Filed: May 18, 2012

(86) PCT No.: PCT/CN2012/075746
§ 371 (c)(1),
(2), (4) Date: Oct. 30, 2014

(87) PCT Pub. No.: WO2013/170482
PCT Pub. Date: Nov. 21, 2013

(65) Prior Publication Data
US 2015/0094064 A1   Apr. 2, 2015

(51) Int. Cl.
*H04W 36/22* (2009.01)
*H04W 76/02* (2009.01)
*H04W 36/00* (2009.01)

(52) U.S. Cl.
CPC ........... *H04W 36/22* (2013.01); *H04W 76/023* (2013.01); *H04W 36/00* (2013.01)

(58) Field of Classification Search
CPC ......... H04W 76/043; H04W 72/0413; H04W 76/021; H04W 28/06; H04W 28/14; H04W 36/0005; H04W 36/14; H04W 36/30; H04W 48/18; H04W 4/06; H04W 76/023; H04W 84/12; H04W 84/18; H04W 88/182; H04L 1/1854; H04L 2001/0097
See application file for complete search history.

(56) References Cited

U.S. PATENT DOCUMENTS 8,514,778 B1 * 8/2013 Fang ............... H04W 4/06
                                                370/328
8,848,700 B2 * 9/2014 Ahn ................ H04W 72/04
                                                370/252

(Continued)

FOREIGN PATENT DOCUMENTS

CN       1271221        10/2000
CN       1271221 A  *  10/2000  ........... H04L 1/1854

(Continued)

OTHER PUBLICATIONS

International Search Report received for corresponding Patent Cooperation Treaty Application No. PCT/CN2012/075746, dated Feb. 26, 2013, 3 pages.

(Continued)

*Primary Examiner* — Matthew Sams
(74) *Attorney, Agent, or Firm* — Mintz Levin Cohn Ferris Glovsky and Popeo, P.C.

(57) ABSTRACT

Disclosed are methods and apparatus for a switch from a first communication path between a first device and a second device to a second communication path to be established between the first device and the second device. A method can comprise: in response to the initiation of the switch, sending a notification of the initiation of the switch to a base station for setting up an intermediate communication path between the first device and the second device, wherein the intermediate communication path is relayed by the base station and does not pass a core network; and delivering traffics between the first device and the second device via the intermediate communication path until the second communication path is established.

21 Claims, 7 Drawing Sheets

(56) References Cited

U.S. PATENT DOCUMENTS

| | | | |
|---|---|---|---|
| 9,288,729 B2* | 3/2016 | Jang | H04W 36/00 |
| 2006/0215576 A1* | 9/2006 | Yu | H04W 48/18 |
| | | | 370/252 |
| 2009/0017824 A1* | 1/2009 | Lee | H04W 36/14 |
| | | | 455/437 |
| 2009/0040985 A1* | 2/2009 | Barnawi | H04B 7/2681 |
| | | | 370/336 |
| 2010/0279672 A1 | 11/2010 | Koskela et al. | |
| 2012/0265818 A1* | 10/2012 | Van Phan | H04W 8/005 |
| | | | 709/204 |
| 2013/0083779 A1* | 4/2013 | Ahn | H04W 72/04 |
| | | | 370/336 |
| 2013/0201954 A1* | 8/2013 | Gao | H04W 72/0413 |
| | | | 370/329 |
| 2013/0244661 A1* | 9/2013 | Lin | H04W 76/023 |
| | | | 455/436 |
| 2013/0324114 A1* | 12/2013 | Raghothaman | H04W 76/023 |
| | | | 455/426.1 |
| 2014/0128089 A1* | 5/2014 | Jang | H04W 72/082 |
| | | | 455/452.2 |

FOREIGN PATENT DOCUMENTS

| | | | | |
|---|---|---|---|---|
| CN | 1606894 | 4/2005 | | |
| CN | 101247647 | 8/2008 | | |
| GB | WO 2012048464 A1 * | 4/2012 | | H04W 76/043 |
| WO | 2010/097645 A1 | 9/2010 | | |
| WO | 2012048464 | 4/2012 | | |

OTHER PUBLICATIONS

"3rd Generation Partnership Project; Technical Specification Group Services and System Aspects; Policy and charging control architecture (Release 11)", 3GPP TS 23.203, v11.4.0, Dec. 2011, pp. 1-167.

Extended European Search Report received for corresponding European Patent Application No. 12876768.8, dated Jan. 20, 2016, 7 pages.

"Device-to-device communication as an underlay to LTE-advanced networks", IEEE Communications Magazine, vol. 47, No. 12, Dec. 2009, pp. 42-49.

* cited by examiner

METHOD AND APPARATUS FOR SWITCH

RELATED APPLICATION

This application was originally filed as PCT Application No. PCT/CN2012/075746 filed May 18, 2012.

TECHNICAL FIELD

The exemplary and non-limiting embodiments of this invention relate generally to wireless communication technology, and more particularly, relate to the switch between a device-to-device (herein after referred to as "D2D") communication path and an infrastructure communication path.

BACKGROUND

With the development of the future service, next generation wireless communication systems, such as 3GPP (third Generation Partnership Project) LTE (long term evolution) and beyond system, IMT-A (International Mobile Telecommunications-Advanced) system etc. are introduced to satisfy high speed, large capacity, and a high QoS (Quality of Service) for billions of subscribers. The D2D communication is introduced as a key feature to be supported by the next generation wireless communication systems. In a D2D communication, traffics are transported directly between two user equipments via a D2D communication path without using any network infrastructure (e.g. comprising the radio access network and the core network). In comparison with a cellular communication in which traffics are transported between two user equipments via an infrastructure communication path using the network infrastructure, a D2D communication can bring in the following advantages: power saving, capacity improvement, higher bit-rate and lower service cost etc. for end user perspective; offload of the core network, higher revenue, larger market penetration and new services for network operator.

As such, when radio link conditions for a D2D communication is favorable, for example if two user equipments are close to each other, and/or if a D2D communication actually offers higher throughput than a cellular communication, it would benefit the end users and the network operator by using a D2D communication path for transporting traffic directly between the two user equipments, instead of using an infrastructure communication path. Then, there exist a need to switch from an infrastructure communication path to a D2D communication path. Furthermore, when two equipments are in a D2D communication, transport conditions for the D2D communication may become unfavorable. For example, if one of two user equipments leaves, and/or if a cellular communication can achieve higher throughput than a D2D communication, there may exist a need to switch from the D2D communication path to an infrastructure communication path.

Generally, using a D2D communication path or an infrastructure communication path is transparent to the end user (i.e., the end user does not have to select a special option for using whether a D2D communication path or an infrastructure communication path). Thus, it is desired to not cause the service interruption when switch between a D2D communication path and an infrastructure communication path, to guarantee user satisfaction.

From this issue, it would be advancement in the art to provide solutions that allow for seamless switch between a D2D communication path and an infrastructure communication path.

SUMMARY OF THE INVENTIONS

To overcome limitations in the prior art described above, and to overcome other limitations that will be apparent upon reading and understanding the present specification, the disclosure provides a method for switch of D2D communications and related apparatus and computer program products.

In a first aspect of the exemplary embodiments of the present invention provide a method for a switch from a first communication path between a first device and a second device to a second communication path to be established between the first device and the second device. The method comprises: in response to the initiation of the switch at the first device, sending a notification of the initiation of the switch at the first device to a base station for setting up an intermediate communication path between the first device and the second device, wherein the intermediate communication path is relayed by the base station and does not pass a core network; and delivering traffics between the first device and the second device via the intermediate communication path until the second communication path is established.

In a second aspect of the exemplary embodiments of the present invention provide a method for a switch from a first communication path between a first device and a second device to a second communication path to be established between the first device and the second device. The method comprises receiving at a base station, a notification of an initiation of the switch at the first device; setting up an intermediate communication path between the first device and the second device, wherein the intermediate communication path is relayed by the base station and does not pass a core network; and forwarding traffics between the first device and the second device via the intermediate communication path until the second communication path is established. The setting up of the intermediate communication path can comprises configuring radio resources between the base station and each of the first device and the second device, to enable the configured radio resources to be used for the intermediate communication path and the second communication path.

In a third aspect of the exemplary embodiments of the present invention provide an apparatus for a switch from a first communication path between a first device and a second device to a second communication path to be established between the first device and the second device. The apparatus comprises: at least one processor; and at least one memory including computer program code. The at least one memory and the computer program code configured to, with the at least one processor, cause the apparatus to perform at least the following: in response to the initiation of the switch at the first device, send a notification of the initiation of the switch at the first device to a base station for setting up an intermediate communication path between the first device and the second device, wherein the intermediate communication path is relayed by the base station and does not pass a core network; and deliver traffics between the first device and the second device via the intermediate communication path until the second communication path is established.

In a fourth aspect of the exemplary embodiments of the present invention provide an apparatus for a switch from a first communication path between a first device and a second device to a second communication path to be established between the first device and the second device. The apparatus comprises at least one processor; and at least one memory including computer program code. The at least one memory and the computer program code configured to, with the at least one processor, cause the apparatus to perform at least the following: receive at a base station, a notification of an initiation of the switch at the first device; set up an intermediate communication path between the first device and the second device, wherein the intermediate communication path is relayed by the base station and does not pass a core network; and forward traffics between the first device and the second device via the intermediate communication path until the second communication path is established.

The exemplary embodiments of the present invention further provide computer-readable storage mediums and computer program product, carrying one or more sequences of one or more instructions which, when executed by one or more processors, cause an apparatus to at least perform the steps of a method according to the first and second aspect of the exemplary embodiments of the present invention.

Those of skill in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF EXEMPLARY EMBODIMENTS

An exemplary embodiment of the present invention will be hereinafter described with reference to the drawings.

Figure 1:
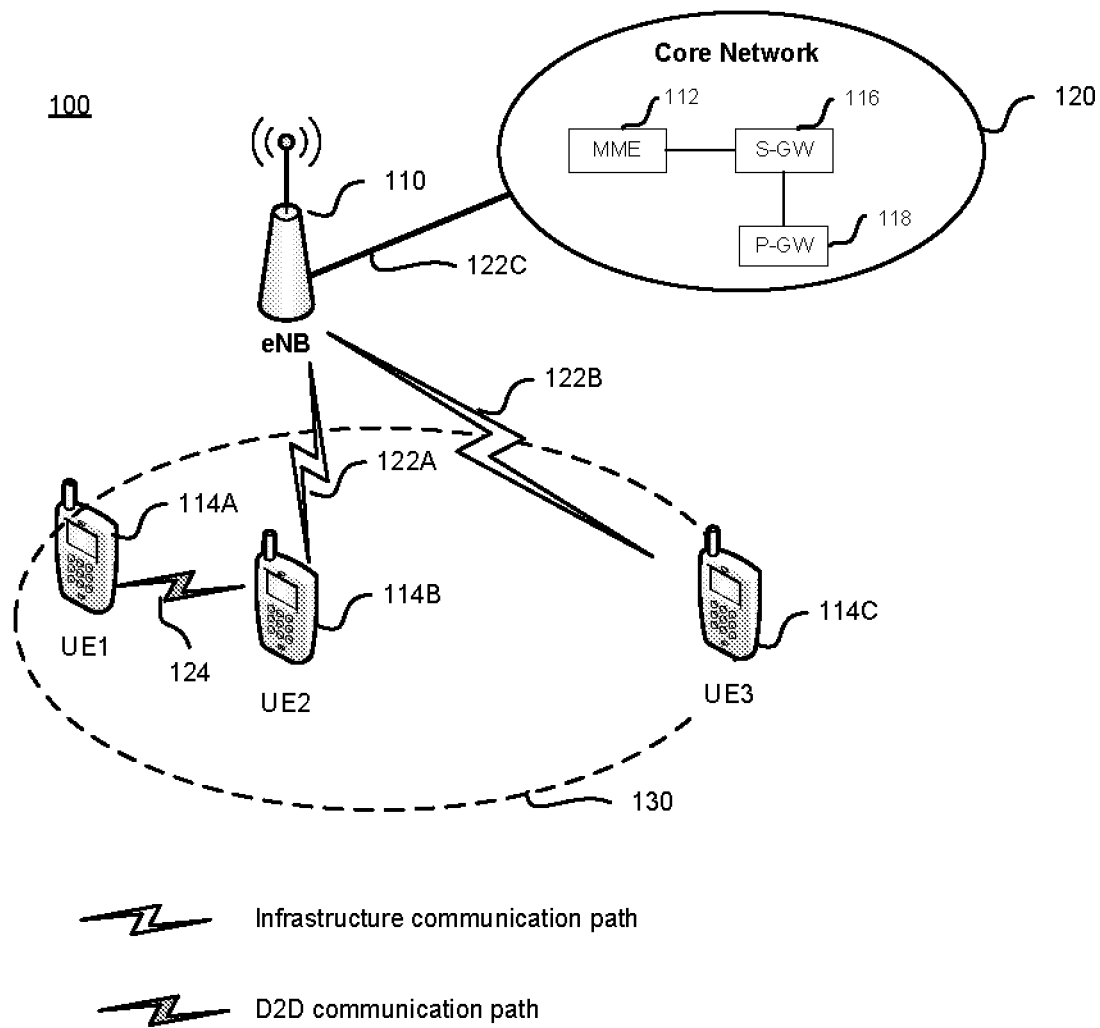
FIG. 1 shows a wireless communication system in which at least one embodiment of the present invention can be implemented.

FIG. 1 shows a wireless communication system 100 in which at least one embodiment of the present invention can be implemented. The wireless communication system 100 includes a base station 110 supporting a corresponding service or coverage area 130 (also referred to as a cell). The base station 110 is also capable of communicating with wireless devices, such as user equipment 114A-C, within the coverage area. Although FIG. 1 depicts one base station 110, and three user equipments 114A-C, other quantities of base stations and user equipments may be implemented as well.

In some implementations, the base station 110 implemented as an evolved Node B (eNB) type base station consistent with standards, including the Long Term Evolution (LTE) standards. The user equipments 114A-C may be mobile and/or stationary. Moreover, the user equipments 114A-C may be referred to as, for example, devices, mobile stations, mobile units, subscriber stations, wireless terminals, terminals, or the like. The user equipments may be implemented as, for example, a wireless handheld device, a wireless plug-in accessory, or the like. For example, the user equipment may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface. The wireless communication system 100 may include a core network 120. The core network 120 comprises the conventional network nodes and function of a cellular communication network, such as MME 112 (Mobility Management Entity), S-GW (Serving Gateway) 116, P-GW (PDN Gateway) 118, HSS (Home Subscriber Server), etc. Network nodes in the core network can be organized in a basic structure and operate in a basic way well known to one skilled in the art.

In some implementations, the wireless communication system 100 can be configured to comply substantially with a standard system specification, such as LTE or other wireless standards, such as WiBro, WiFi, Bluetooth, IEEE 802.16, or it may be a proprietary system. For example, the wireless communication system 100 may include two kinds of communication paths for communications between two user equipments. One is an infrastructure communication path which is routed over a network infrastructure such as communication links 122A-C, between the user equipment 114B and the user equipment 114C. The links 122A and 122B each represents radio access links between the user equipments and access nodes of the radio access network, such as an eNB. The link 122C represents a link between the radio access network and the core network. For example, the links 122A-C may be configured as cellular communication links in accordance with LTE and/or LTE-Advanced. The other kinds of communication paths for communications between two user equipments can be a D2D communication path which is routed directly between two user equipments without using any network infrastructure, such as a communication link 124 between the user equipment 114A and 114B. For example, links 124 may be configured as D2D links in accordance with WiFi or Bluetooth. D2D communication links may be incorporated in public land mobile systems, such as the 3rd Generation Partnership Project (3GPP) as well as subsequent generations of wireless systems to provide cellular controlled D2D communications. The cellular system, such as the eNB 110 or SGW (serving gateway), may be used to aid in the establishment and ongoing control of the D2D links 124 (e.g., radio resources by the D2D links, switch control, etc).

In an example scenario, two equipments (such as 114B and 114C) which are being in communication via an infrastructure communication path (such as 122A-C) are being moved to be in close proximity to each other. Then, for example for the sake of power saving, cost saving, and/or offload of the core network etc., it may be necessary to switch the infrastructure communication path between them to a D2D communication path, for transporting traffic directly between the two user equipments. In another example scenario, two equipments (such as 114A and 114B) which are being in communication via a D2D communication path (such as 124) are moved away from each other. Then, transport conditions of the D2D link 124 may become bad, so that the D2D communication path is not available between the two user equipments. As such, to avoid communications between the two user equipments being interrupted, the two user equipments may have to switch the communications between the two user equipments from the D2D communication path to other available communication path, such as an infrastructure communication path.

However, currently there is no method proposed to seamless switch a communication path between two user equipment from a D2D communication path to an infrastructure communication path, or from an infrastructure communication path to a D2D communication path. A more straightforward idea is to setup the target communication path, then switch all traffics between the two user equipments from the current communication path to the target communication path. However, this type of switch can cause the service interruption. Using a switch from a D2D communication path to an infrastructure communication path as an example, the typical service request procedure may takes 100 ms in an LTE system. If the user equipments just simply stop the current D2D communication path, and then switch to an LTE system to establish an infrastructure communication path, the current service may be interrupted for at least 100 ms. This can cause serious service interruption for some services. For example, as specified in 3GPP standards (e.g. 3GPP TS 23.203), the delay budget for a service of a real-time gaming is only 50 ms.

Furthermore, according to conventional switch mechanism, a service request procedure for initiating a switch is only performed for specific use equipment. In other words, user equipments involved in a communication will not be synchronized on when to perform the switch. This will cause some issues under certain conditions.

For example, during a switch from a D2D communication path (such as 124) between a user equipment (such as 114A) and its peer user equipment (such as 114B) to an infrastructure communication path, both of the involved user equipments are using the D2D communication path. In an example scenario, the user equipment 114B is receiving streaming data from the user equipment 114A. The user equipment 114A detects that the D2D communication path 124 is becoming worse. Then, the user equipment 114A may initiate a service request procedure to setup an infrastructure communication path for communications between the user equipment 114A and the user equipment 114B. A conventional service request procedure is only performed for specific use equipment. Accordingly, the setup of an infrastructure communication path in the side of the user equipment 114A does not trigger the setup of an infrastructure communication path in the side of its peer user equipment 114B. As such, the user equipment 114B is still waiting for a data reception and is still transmitting data over the D2D communication path 124, while the user equipment 114A has initiated the setup of an infrastructure communication path. This may cause the user equipment failing to receive traffics from the peer user equipment. The user equipment 114B may finally realize that the user equipment 114A send the data over an infrastructure communication path, until the cellular network initiated a service request due to the data sent from the user equipment 114A. Then, the procedure of the switch will take a period comprising an UE initiated service request procedure in the side of a user equipment (such as 114A), and the followed network initiated service request in the side of the peer user equipment (such as 114B). If the peer user equipment (such as 114B) uses a long paging cycle after a start of a D2D application, the delay of the followed network initiated service request in the side of the peer user equipment will be even larger.

Issues may also happen in a switch from an infrastructure communication path to a D2D communication path. For example, in order to avoid data loss, before the a user equipment switch to a D2D communication path, the user equipment needs to make sure that it has received the last data packet sent from the peer user equipment via the infrastructure path. Assuming there are traffics of two applications communicated over the D2D communication path. A first application (e.g. real-time gaming) of the two applications has a property of QoS with the max delay budget 50 ms. The second application (e.g. buffered streaming) of the two applications has a property of QoS with the max delay budget 300 ms. The user equipment may have to wait for 600 ms in order to not miss the last data for the second application sent from peer user equipment via the infrastructure communication path. However, the peer user equipment does not know when the infrastructure communication path will be released. This may cause the delay of the first application going beyond its max delay budget (50 ms), deteriorating the user experience of the first application.

Figure 2:
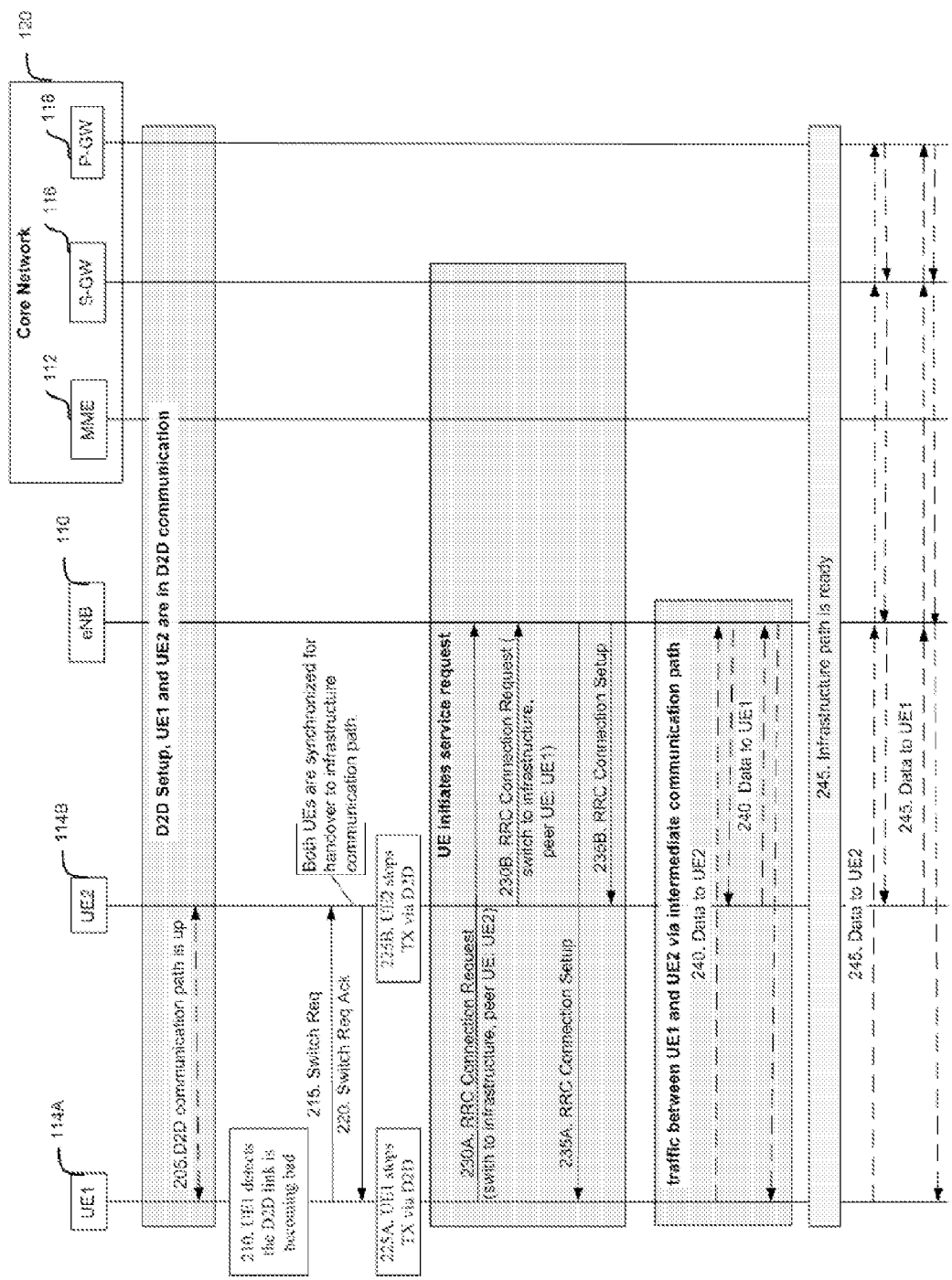
FIG. 2 depicts an example timing diagram illustrating a switch from a D2D communication path to an infrastructure communication path according to embodiments of the present invention.

FIG. 2 depicts an example timing diagram illustrating a switch from a D2D communication path to an infrastructure communication path according to embodiments of the present invention. Referring to FIG. 2 and FIG. 1, user equipments 114A and 114B (hereafter denoted as UE1 and UE2 respectively) are communicating directly via a D2D communication path, at 205.

Figure 3A:
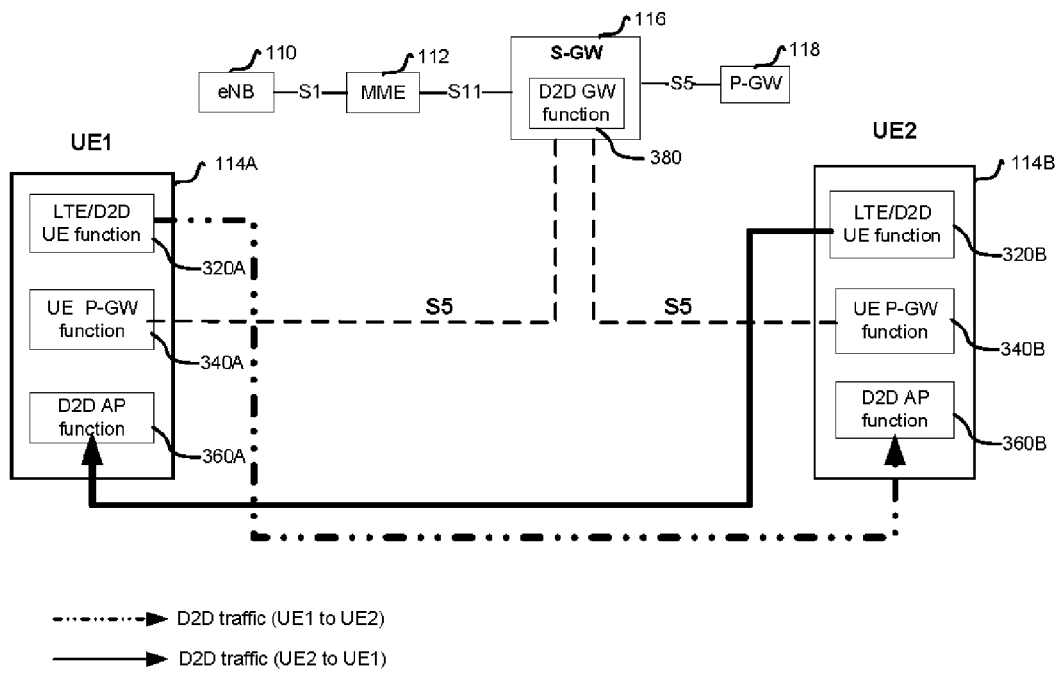
FIGS. 3a and 3b illustrate logical architectures for control of a cellular controlled D2D communication in accordance with exemplary embodiments of the present invention.

As mentioned with respect to FIG. 1, the D2D communication between UE1 and UE2 can be a cellular controlled D2D communication, in which network nodes in a cellular system, such as the eNB 110 or MME 112 and S-GW 116, may be used to aid in the establishment and ongoing control of the D2D links. FIG. 3a illustrates a logical architecture for control of a cellular controlled D2D communication between UE1 and UE2, according to an exemplary embodiment. Each user equipment in a D2D communication pair, e.g. UE1, UE2, can comprise an LTE and D2D UE function module (320A, 320B) for connecting with eNB(s) and other D2D communication pairs, a P-GW function module (340A, 340B) for handling the D2D traffics to/from another peer UE, and a D2D AP (Access Point) function module (360A, 360B) for supporting a D2D communication path between the two UEs without passing eNB 110 and the core network 120. A D2D GW (Gateway) function module 380 is provided in the core network for control of D2D communications, for example comprising filtering, buffering and forwarding the D2D traffic. The D2D GW function module 380 can reside in the S-GW for the UEs.

Conventionally, S5 interface is used to provide user plane tunneling and tunnel management between S-GW and P-GW. In an example embodiment, both of the D2D GW function module 380 in S-GW 116 and the P-GW function modules (340A and 340B) in UEs (UE1 and UE2) can have an S5 interface. Then, via the S5 interfaces, the D2D GW function module 380 can coordinate with the P-GW function modules 340A and 340B, to control the D2D communication between UE1 and UE2, as shown by the broken lines in FIG. 3a. Characters of an S5 interface are available in 3GPP specifications.

For example, when the D2D GW function module 380 sends a S5 packet to a UE P-GW function module (e.g. 340A or 340B), the destination of the S5 packet is the IP address of a D2D UE (e.g. 114A or 114B, respectively), so the S5 packet can be sent to the P-GW serving the D2D UE, then delivered to the P-GW function module resides in the D2D UE. This IP packet can be routed from the D2D GW 380 to PGW 118 serving the D2D UE, to SGW serving the D2D UE, to eNB serving the D2D UE, and to the P-GW function module in the D2D UE. When a UE P-GW function module (e.g. 340A or 340B) in a D2D UE sends an S5 packet to a D2D GW function module (e.g. 380), the D2D UE can send it as a normal IP packet with the destination address as the D2D GW's IP address. This IP packet can be routed from the D2D UE (P-GW function module) to the eNB serving the D2D UE, to SGW serving the D2D UE, to PGW serving the D2D UE, and then to the D2D GW function module.

Figure 3B:
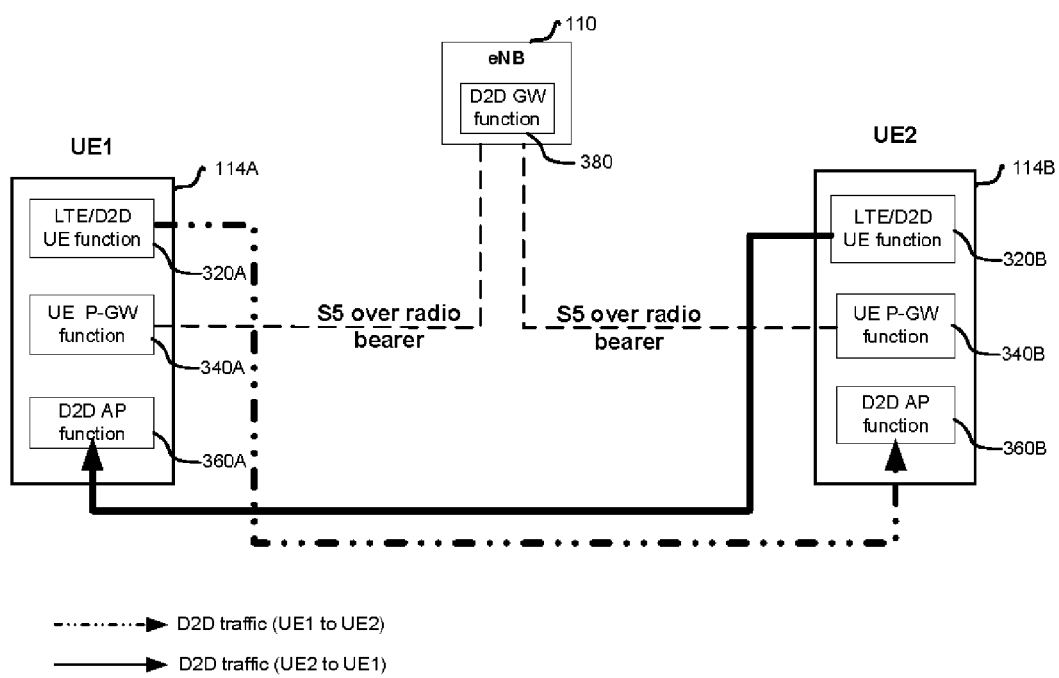

Alternatively, the control of D2D communications can be performed in eNB without using the core network. FIG. 3b illustrates a logical architecture for such scenario according to an exemplary embodiment. As shown in FIG. 3b, the D2D GW function module can reside in an eNB. As such, the D2D GW function module 380 in eNB can coordinate with the P-GW function modules 340A and 340B via S5 interfaces, to control the D2D communication between UE1 and UE2, as shown by the broken lines in FIG. 3b.

For example, when a setup of a D2D communication is initiated at UE1, UE1 can send a message including the radio bearer required for the D2D communication, the information of the peer UE, and other D2D related context information, to the cellular system. The information of the peer UE can be the identity of the peer UE, or any other information that assists the cellular system to identify the peer UE, e.g. IP address. The other D2D related context information can include the context information that is only known by both UEs participated in the D2D communication, for example a security token, which may be exchanged during the UE's attach procedure to the cellular system, or via a high-level application.

Then, in the example embodiment as shown in FIG. 3b, the eNB 110 can obtain the D2D related context directly from UE1, and then forward the D2D related context information to UE2, for example in an D2D Setup Request (e.g. using the Create Session Request message over the radio interface) to the PGW function module 340B collocated in the UE2 via a S5 interface. Alternatively, in the example embodiment as shown in FIG. 3a, the eNB 110 does not have the D2D related context (e.g. the D2D GW module 380 is located in the core network) directly from the UE1, the eNB 110 can continue the service request procedure of setting up a D2D communication, but indicate the need to setup a D2D communication path to the core network, e.g. the D2D GW module 380. Then the D2D GW module 380 can send the D2D setup Request as the Create Session Request message to the P-GW function module 340B collocated in UE2. During the setup of a D2D communication, the eNB 110 can memorize the D2D related context information, for example, including identities of the two UEs, the radio bearer and its associated QoS information, etc. Then, after the D2D communication is setup, both of UE1 and UE2 can use the D2D communication path.

Now return back to FIG. 2 again. At 210, it is determined to switch communications or traffics between user equipments UE1 and UE2 from the D2D communication path to other available communication path, e.g. an infrastructure communication path. In an example embodiment, the user equipment UE1 can detects that radio link conditions of the D2D communication path is becoming bad, for example based on the signal strength, bit error rates, distance between UE1 and UE2, etc. Then, UE1 can trigger a switch from the current D2D communication path to an infrastructure communication path between UE1 and UE2, and initiate the switch in the side of UE1.

In another example embodiment, the switch may be triggered by network nodes, such as eNB, S-GW, etc. For example, the switch may be triggered by eNB 110 for user equipment UE1 based on measurement reports received by the eNB 110 from the user equipment UE1. For example, the measurement report may include information, such as link quality, base station load, and the like, indicating that a switch to another available communication path should be initiated. Then, UE1 can initiate a switch to an infrastructure communication path in its side.

At 215, in response to the initiation of the switch, UE1 can send a request (e.g. a Switch Request message) to UE2, requesting UE2 to initiate a switch from the current D2D communication path to an infrastructure communication path in the side of UE2. The request can be transmitted directly to UE2 via the D2D communication path. Alternatively or additionally, the request can be send to UE2 via a network node, for example via the eNB 110, or other network nodes. In an example embodiment, the request message can comprise information indicating the last data block to be transmitted from UE1 to the UE2 via the D2D communication path. For example, the request message can comprise information of sequence numbers of the packets to be transmitted to the UE2. With this information, UE2 can determine the last packet sent out from UE1 via the D2D communication path, enabling UE2 releasing the D2D communication path at an appropriate time without missing data.

At 220, UE1 can receive an acknowledgement from UE2, acknowledging the initiation of the switch in the side of UE2. This means that both of UE1 and UE2 have been synchronized for switch to an infrastructure communication path. In an example embodiment, the acknowledgement can comprise information indicating the last data block to be transmitted from UE2 to the UE1 via the D2D communication path. For example, the request message can comprise information of sequence numbers of the packets to be transmitted to the UE1. With this information, UE1 can determine the last packet sent out from UE2 via the D2D communication path, enabling UE1 releasing the D2D communication path at an appropriate time without missing data.

At 225A and 225B, both of UE1 and UE2 can stop transmitting data to each other via the D2D communication path.

At 230A and 230B, in response to the initiation of the switch, both of UE1 and UE2 can send a notification of an initiation of the switch, to eNB 110 for setting up an intermediate communication path between the UE1 and UE2. For example, the notification can be carried with an RRC Connection Request message (as specified in 3GPP specifications) for initiating a service request procedure of an establishment of an infrastructure communication path. The notification can comprise information indicating the initiation of the switch at the corresponding UE. For example, the RRC Connection Request message can comprise a flag indicating that the cause for the establishment is due to the switch from a D2D communication path to an infrastructure communication path. The notification can further comprise information of the peer user equipment, such as the identity of the peer user equipment. Then, with the notification, the eNB 110 can determine that an intermediate communication path is needed to be established for avoiding service interruption during the switch.

In an alternative embodiment, in response to the initiation of the switch, UE1 can send a notification of an initiation of the switch to eNB 110 for setting up an intermediate communication path between the UE1 and UE2 . For example, the notification can be carried with a RRC Connection Request message for initiating a service request procedure of an establishment of an infrastructure communication path. The RRC Connection Request message can comprise a flag indicating that the establishment cause for the establishment is due to the switch from a D2D communication path to an infrastructure communication path, and information of the peer user equipment, such as the identity of UE2 in this example. With the received notification, the eNB 110 can determine that an intermediate communication path is needed to be established for avoiding service interruption during the switch. In addition, eNB 110 can trigger a network initiated service request procedure towards the peer UE (i.e. UE2 in this example), for an establishment of an infrastructure communication path. In response to the network initiated service request procedure, the UE2 can initiate a switch from the current D2D communication path to an infrastructure communication path in the side of UE21.

At 235A and 235B, upon the reception the notification of the switch from a D2D communication path to an infrastructure communication path, the eNB 110 can proactively allocate the radio resource for the intermediate communication path, for example before or in parallel with the establishment of the infrastructure communication path in the core network. For example, eNB 110 can send an RRC Connection Setup message to UE1 at 235A, indicating information of the radio resource (or radio access bear) allocated for a segment of the intermediate communication path between UE1 and eNB 110. At 235B, eNB 110 can send another RRC Connection Setup message to UE2 , indicating information of the radio resource (or radio access bear) allocated for a segment of the intermediate communication path between UE2 and eNB 110. Then, UE1 and UE2 can communicate with the allocated radio resources (or radio access bears) via the intermediate communication path, without passing a core network, such as the core network 120. In an example embodiment, UE1 and UE2 can respectively send an acknowledgement to eNB 110, for example with a RRC Connection Setup Complete message, in response to the completion of establishing the intermediate communication path.

As illustrated at 240, both UE1 and UE2 can deliver data their between with the intermediate communication path which is relayed by the eNB 110. In this regard, through the intermediate communication path, the eNB 110 can forward traffics from UE1 directly to UE2 , and forward traffics from UE2 directly to UE1 , without passing the core network. Thus, the interruption of services between UE1 and UE2 will be reduced to only the establishment of the intermediate communication path. For example, the delay due to a setup of radio access bearer is only a few 10 ms.

In an example embodiment, the RRC Connection Request messages can also include additional information related to the D2D communication to be switched, e.g. QoS, bearer information, capability, etc. This information may be used for the location of radio resources for the intermediate communication path, so that the intermediate communication path can be appropriate for carrying the traffics switched from the D2D communication path. For example, eNB 110 can configure the intermediate communication path with a QoS similar with the QoS of the D2D communication as much as possible, so that the service between the two user equipments will not be degraded too much during the switch. Alternatively, at least part of this additional information can be memorized by eNB 110 during the procedure of setting up the D2D communication path between the UE1 and UE21.

At 245, dependent on the operator policy, an infrastructure communication path between UE1 and UE2 is established. Then, traffics between UE1 and UE2 are switched from the intermediate communication path to the infrastructure communication path routed via the core network, at 250. Up to now, the D2D communication path between UE1 and UE2 is completely switched to the infrastructure communication path.

In an example embodiment, to expedite the switch, the radio resources allocated for the intermediate communication path can be reused for the infrastructure communication path. For example, the eNB 110 can further indicate in the RRC Connection Setup messages at 235A and 235B that the same radio resources are to be used for the target infrastructure communication path. Then, when the eNB 110 knows the infrastructure communication path is ready in the core network, e.g. via the S1 message received from the MME 112, the eNB 110 can start to use the core network to route the traffics of UE1 and UE2 , without necessary for reallocating radio resources for the infrastructure communication path for UE1 and UE21.

Although many operations are described in a certain order with reference to FIG. 2, it should be appreciated that these operations can be performed in alternative orders, and some operations can be adjusted, combined, or even omitted. For example, in an example embodiment, the request to UE2 for initiating a switch in the side of UE2 (step 215) can be send almost simultaneously with the notification to eNB 110 (step 230) from UE1 . Furthermore, the request and notification can transmitted together in a message to eNB 110, and then eNB 110 can forward the request to UE2 . In an example embodiment, the establishment of the infrastructure communication path can be performed in parallel with the establishment of the intermediate communication path.

Figure 4:
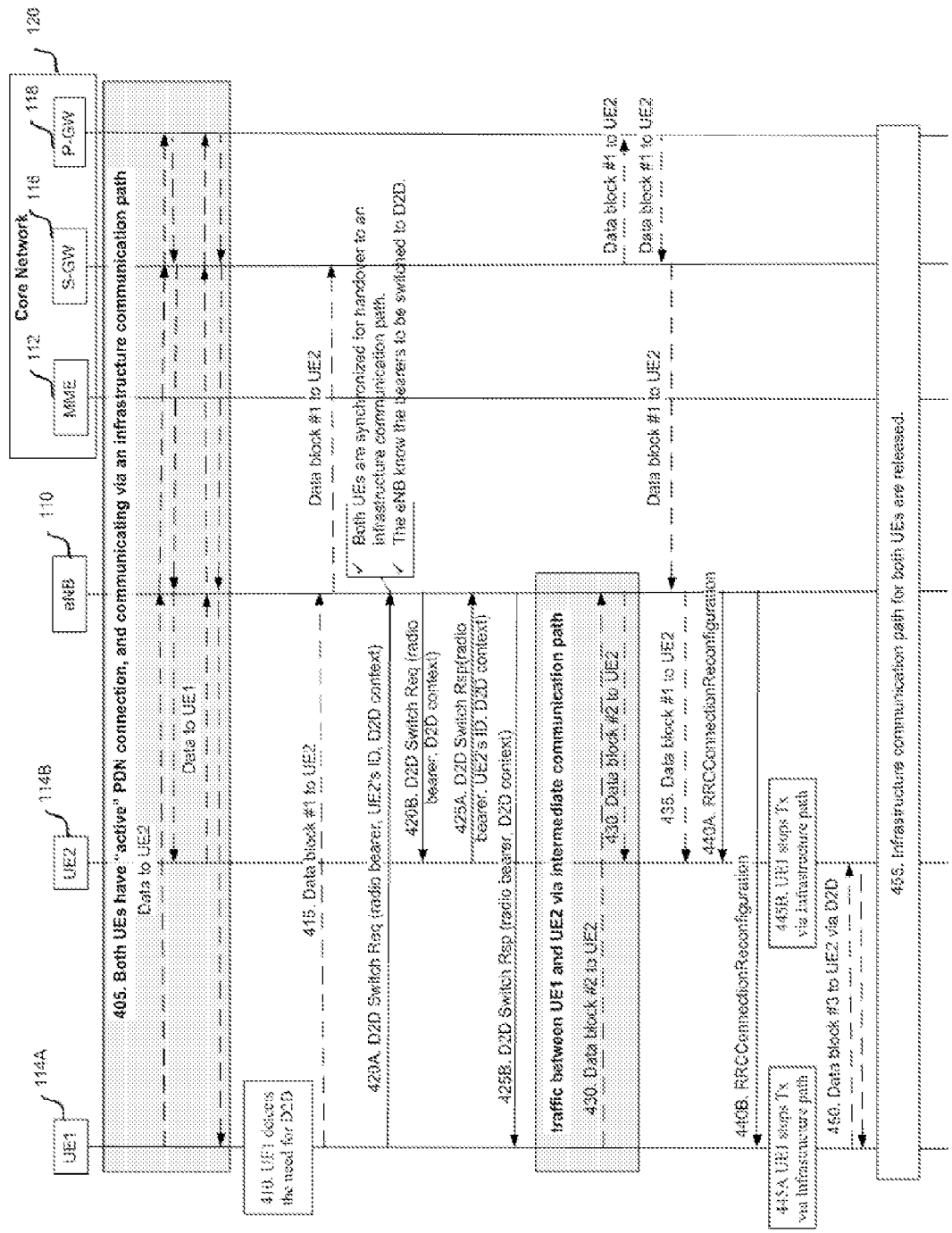
FIG. 4 shows a timing diagram illustrating a switch from an infrastructure communication path to a D2D communication path according to embodiments of the present invention.

FIG. 4 depicts an example timing diagram illustrating a switch from an infrastructure communication path to a D2D communication path according to embodiments of the present invention. Referring to FIG. 4 and FIG. 1, user equipments 114A and 114B are communicating via an infrastructure communication path (e.g. in a PDN connection), at 405.

At 410, it is determined to switch communications between user equipments UE1 and UE2 from the currently used infrastructure communication path to a D2D communication path. In an example embodiment, the user equipment UE1 can detect that transport conditions of the D2D communication path is becoming available (e.g. by the detection of UE2 in a close proximity to UE1 ), and then trigger the switch, for example, for the sake of cost saving, power saving, etc. In an alternative example embodiment, the switch may be triggered by network nodes, such as eNB, S-GW, for the sake of maximizing network throughout, offloading, etc. For example, the switch may be triggered by eNB 110 for user equipment UE1 based on measurement reports received by the eNB 110 from the user equipment UE1 . Then, UE1 can initiate a switch to a D2D communication path in its side.

At 415, before a D2D communication path is established, UE1 can continue to use the current infrastructure communication path for transmitting data to UE2 . For example, a data block #1 destined to UE2 can be send from UE1 to eNB 110, and then the eNB 100 forward it to the core network (e.g. to a S-GW 114 for UE1 ).

At 420A, in response to the initiation of the switch, UE1 can send a request (e.g. a D2D Switch Request message) to eNB 110, notifying eNB 110 of the switch to a D2D communication path. At the same time, the message can be further forwarded from eNB to UE2 , to request UE2 to initiate a switch from the current infrastructure communication path to the D2D communication path in the side of UE2 . The message can include the radio bearer required for the D2D communication path and related QoS, the information of peer UE (i.e. UE2 in this example), a sequence number of the packet and other D2D related context information. The sequence number information can be used to determine the last packet to be sent out from UE1 to UE2 via the infrastructure communication path. The information of peer UE could be the identity of the peer UE, or any other information that assists the eNB 110 to identify the peer UE, e.g. IP address. The other D2D related context information can comprise the context information that is only known by both UEs to be participated in the D2D communication, for example a security token, which may be exchanged during the attach procedures of UE1 and UE2 , or via a high-level application.

Then, the eNB can memorize the D2D related context information and forward the D2D Switch Request message including the D2D related context information to UE2 , at 420B. For example, in an example embodiment as shown in FIG. 3b, the eNB 110 can obtain the D2D related context directly from UE1 , and then forward the D2D related context information to UE2 , for example in an D2D Switch Request (e.g. using the Create Session Request message over the radio interface) to the PGW function module 340B collocated in the UE2 via the S5 interface. Alternatively or additionally, the D2D switch request can be forwarded to UE2 with a paging message over the radio interface to establish a RRC connection between UE2 and eNB. This paging message may be trigged by S-GW. In another example, as shown in FIG. 3a, the eNB 110 does not have the D2D related context (e.g. the D2D GW module 380 is located in the core network) directly from the UE1 , the eNB 110 can continue the service request procedure of setting up a D2D communication, but indicate the need to setup a D2D communication path to the core network, e.g. the D2D GW module 380. Then, the D2D GW module 380 can send the D2D Switch Request as a Create Session Request message to the PGW function module 340B collocated in UE21.

At 425, UE2 can acknowledge (at 425A) the switch to a D2D communication path by sending a D2D Switch Response message to eNB 110, which can be then forwarded to UE1 (at 425B). This means that both of UE1 and UE2 have been synchronized for switch to a D2D communication path.

In an example embodiment, the D2D related context can be negotiated between UE1 , UE2 , and the eNB 110. For example, the D2D Switch Request message forward to UE2 can include the radio bearer or QoS supported by the eNB 110, besides or instead of the radio bearer or QoS required by UE1 . Similarly, the D2D Switch Response message from UE2 can include the radio bear or QoS acceptable by the UE2 , and the Switch Response message forwarded to UE1 can include the negotiated radio bearer or QoS for the D2D communication. It should be appreciate that the D2D Switch Response message can include no D2D related context information, and for example, just indicate that the D2D related context information is accepted as requested by UE1.

In an example embodiment, the Switch Request messages and Switch Response messages can be exchanged between UE1 and eNB 110 and between UE2 and eNB 110 via the current infrastructure communication path.

In an example embodiment, in response to reception of the notification of the switch from an infrastructure communication path to a D2D communication path (at 420A), the eNB 110 can determine to set up an intermediate communication path between the UE1 and UE2 . In this regard, the eNB 110 can proactively allocate the radio resources for the intermediate communication path, before or in parallel with the establishment of the D2D communication path. For example, eNB 110 can indicate information of the radio resource (or radio access bear) allocated for a segment of the intermediate communication path between UE1 and eNB 110, by using a D2D Switch Response message at 425B, and indicate information of the radio resource (or radio access bear) allocated for a segment of the intermediate communication path between UE2 and eNB 110 use a D2D Switch Request message at 420B. Then, UE1 and UE2 can communicate with the allocated radio resources (or radio access bears) via the intermediate communication path, without passing a core network.

As illustrated at 430, both UE1 and UE2 can deliver data their between with the intermediate communication path which is relayed by the eNB 110. Through the intermediate communication path, the eNB 110 can forward traffics (such as the illustrated data block #2) from UE1 directly to UE2 , and forward traffics from UE2 directly to UE1 , without passing the core network.

During the switch, the eNB 110 may receive the data block #1 from the core network, and then forward it to UE2 , at 435. The forwarding can also go through the infrastructure communication path, or the intermediate communication path. In an example embodiment, the eNB 110 can determine whether this is the last data block sent from UE1 to UE2 via the infrastructure communication path. For example, such determination can be made by the D2D related context information (e.g. the sequence number information) received by eNB 110 at 420A. Then, the eNB 110 can indicate this information to UE1 , enabling UE1 releasing the infrastructure communication path at an appropriate time without missing data. For the data send from UE1 to UE2 via the infrastructure communication path during the switch, eNB can do the similar thing. Alternatively, UE1 and UE2 can make such determination locally based on the D2D related context information exchanged theirbetween at 420 and 425.

In an example embodiment, the eNB can determine when is an appropriate time for a user equipment to stop waiting for receiving data delivered over the infrastructure communication path, based on information related to the infrastructure communication. For example, at an appropriate time determined based on the information of the last data block to be sent out from UE2 to UE1 , the eNB 110 can initiate a RRCConnectionReconfiguration procedure (440) to UE1 for configuring radio resources to be used by UE1 in a D2D communication path, so that UE1 can stop waiting for receiving data delivered over the infrastructure communication path. Details of a RRCConnectionReconfiguration procedure can be found in 3GPP specifications. Similarly, at an appropriate time determined based on the information of the last data block to be sent out from UE1 to UE2 , the eNB 110 can initiate a RRCConnectionReconfiguration procedure (440) for configuring radio resources to be used by UE2 in a D2D communication path, so that UE2 can stop waiting for receiving data delivered over the infrastructure communication path.

Alternatively or additionally, the appropriate time for UE1 and UE2 to stop receiving data delivered over the infrastructure communication path can be determined based on the information of the last data block to be sent out from UE1 to UE2, in conjunction with the information of the last data block to be sent out from UE2 to UE1, and the other information related to the infrastructure communication. For example, in an example embodiment, the eNB 110 can set a timer to determine when to initiate the RRCConnectionReconfiguration procedure. For example, according to the QoS for the radio bearer of UE1 and UE2, the eNB 110 can know the max delay budget for transmission of the traffics over the infrastructure communication path. Then, the eNB 110 can set the value of the timer according to the max delay budget and start the timer when eNB know that the switch from an infrastructure communication path to a D2D communication path is to be performed, (for example when receiving D2D Switch Request message at 420A or when receiving D2D Switch Response message at 425A). Then, when the timer expires, the eNB 110 can initiate the RRCConnectionReconfiguration procedure, so that UE1 and UE2 can stop waiting for receiving data delivered over the infrastructure communication path.

In an example embodiment, to expedite the switch, in the proactive allocation of the radio resources for the intermediate communication path, the eNB 110 can configure the radio resources to enable the configured the radio resources to be used for both the intermediate communication path and the D2D communication path. Then the radio resources allocated for the intermediate communication path can be reused for the D2D communication path. As such, when it is determined to initiate the RRCConnectionReconfiguration procedure, the eNB 110 need not reallocate radio resources for the D2D communication path for UE1 and UE21.

At 445A and 445B, after the D2D communication path is established, both UE1 and UE2 can stop the transmission to the eNB 110 via the infrastructure communication path. At the same time, traffics between UE1 and UE2 are completely switched from the intermediate communication path to the established D2D communication path, at 450. In the case that the radio resources of the intermediate communication path are not reuse by the D2D communication path, the intermediate communication path can be released. Furthermore, at 455, the infrastructure communication path for both UE1 and UE2 can be released, for example via 51 interface. The release can be triggered by the eNB 110 or by the UE1 and UE2. Up to now, the communication path between UE1 and UE2 is completely switched from an infrastructure communication path to a D2D communication path.

Although many operations are described in a certain order with reference to FIG. 4, it should be appreciated that these operations can be performed in alternative orders, and some operations can be adjusted, combined, or even omitted. For example, both UE1 and UE2 can stop the transmission to the eNB 110 via the infrastructure communication path in response to the acknowledgment of the switch of UE21.

Figure 5:
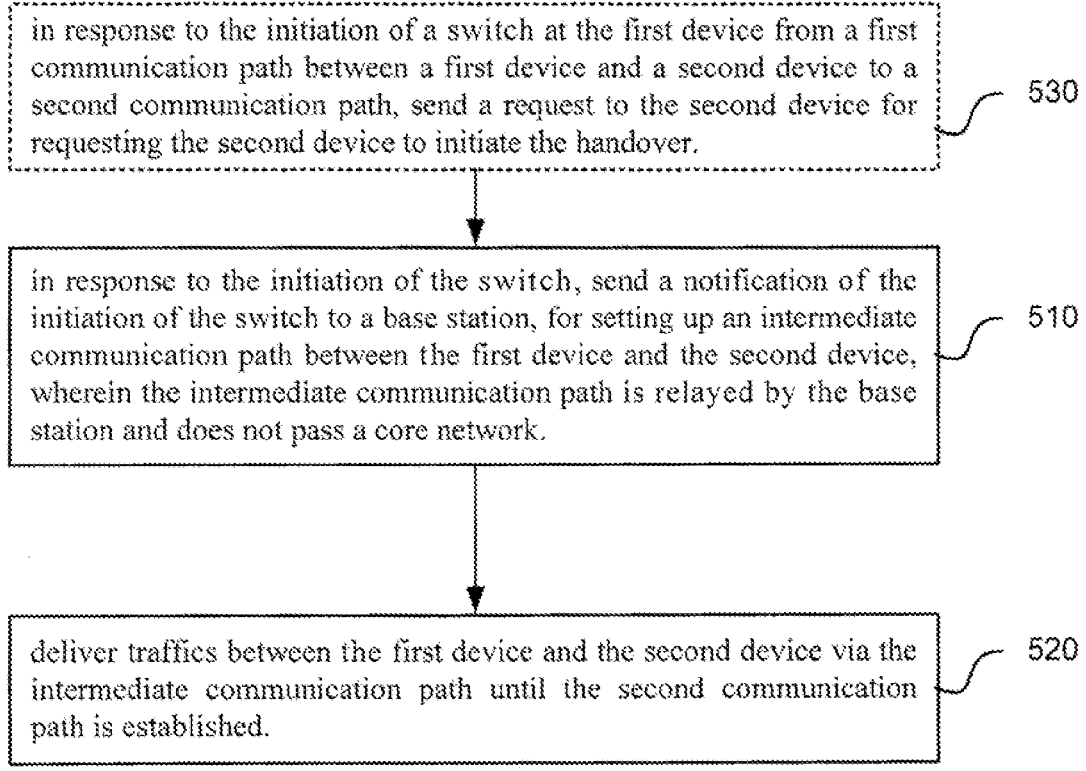
FIG. 5 is a flow chart illustrating a process for switch of D2D communication in accordance with exemplary embodiments of the present invention.
Figure 6:
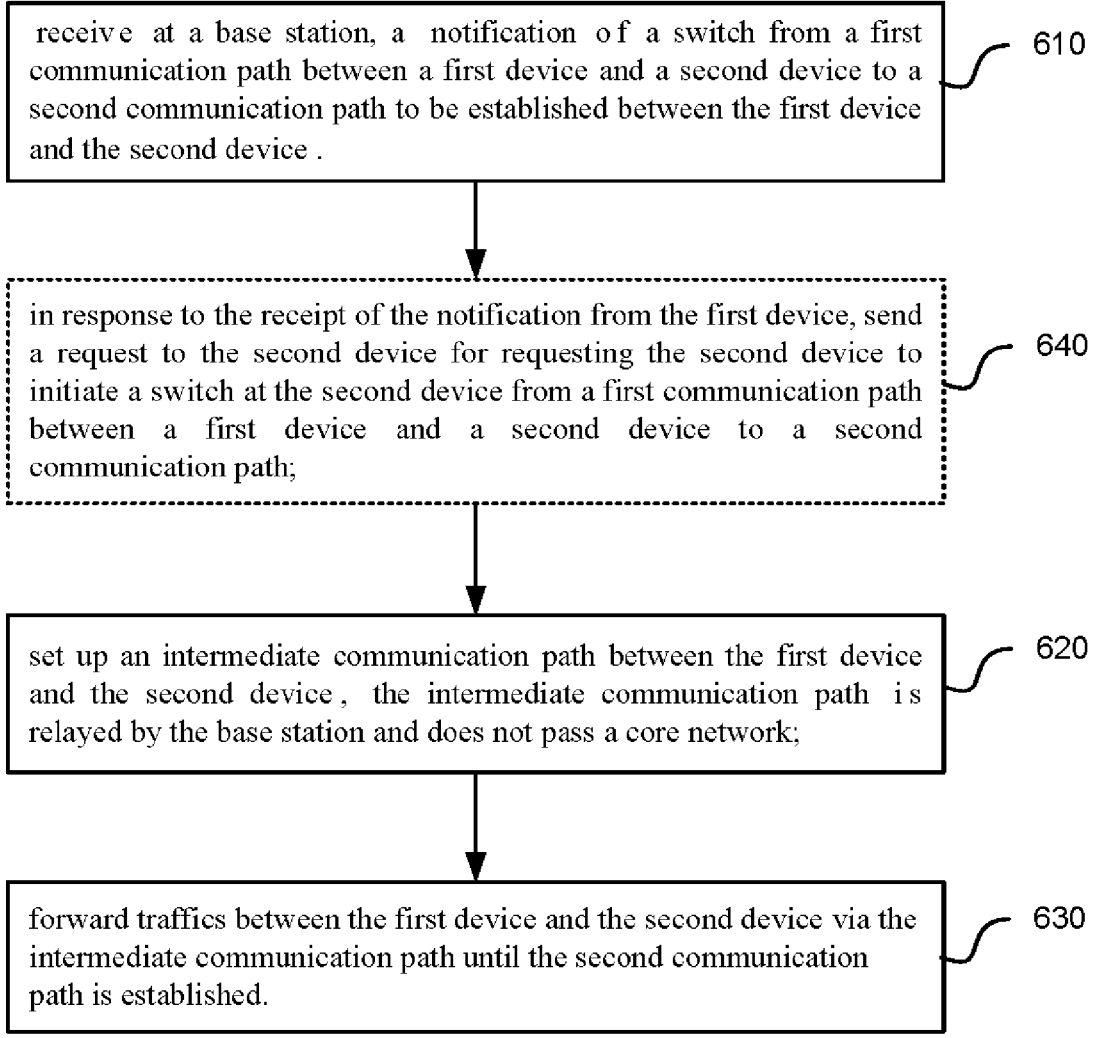
FIG. 6 is a flow chart illustrating a process for switch of D2D communication in accordance with exemplary embodiments of the present invention.

FIGS. 5 and 6 are logic flow diagrams that illustrate the operations of methods, and a result of executions of computer program instructions, in accordance with the example embodiments of this invention for switch from a first communication path between a first device and a second device to a second communication path to be established between the first device and the second device. More specifically, FIGS. 5 and 6 are descriptive of message flow between a user equipment such as UE1, and a base station, such as the eNB 110.

At Block 510 there is a step of, in response to the initiation of the switch, for example at the first device (such as UE1) and/or at the second device (such as UE2), sending a notification of the switch to a base station (such as eNB 110), for setting up an intermediate communication path between the first device and the second device (such as UE2), wherein the intermediate communication path is relayed by the base station and does not pass a core network. At Block 520 there is a step of delivering traffics between the first device and the second device via the intermediate communication path until the second communication path is established. In an example embodiment, at block 530, there is a further step of, in response to the initiation of the switch at the first device, sending a request to the second device for requesting the second device to initiate the switch to the second communication path.

At block 610, there is a step of receiving at a base station, a notification a switch from a first communication path between a first device and a second device to a second communication path to be established between the first device and the second device. At block 620, there is a step of setting up an intermediate communication path between the first device and the second device, the intermediate communication path is relayed by the base station and does not pass a core network. At block 630, there is a step of, forwarding traffics between the first device and the second device via the intermediate communication path until the second communication path is established. In an example embodiment, at block 640, there is a further step of, in response to the receipt of the notification from a first device, sending a request to the second device for requesting the second device to initiate the switch to the second communication path.

The various blocks shown in FIGS. 5 and 6 may be viewed as method steps, and/or as operations that result from operation of computer program code, and/or as a plurality of coupled logic circuit elements constructed to carry out the associated function(s).

Figure 7:
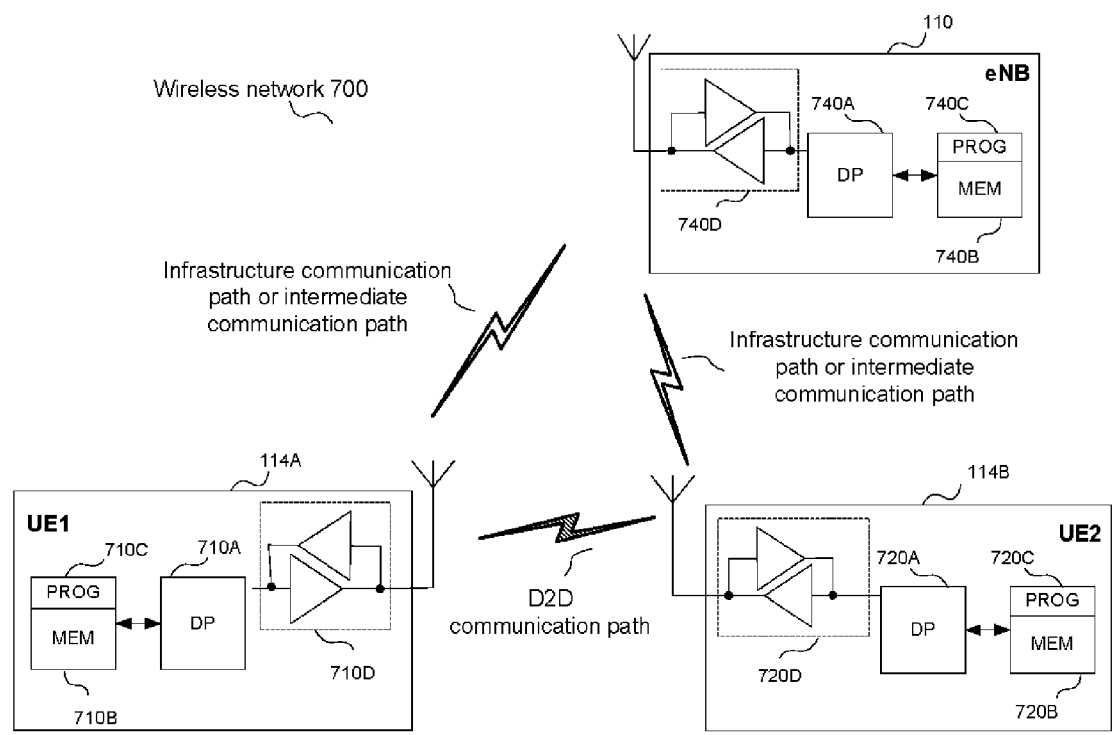
FIG. 7 shows a simplified block diagram of various devices that are suitable for use in practicing the exemplary embodiments of the present invention

Now reference is made to FIG. 7 illustrating a simplified block diagram of various electronic devices that are suitable for use in practicing the exemplary embodiments of the present invention. In FIG. 7, a wireless communication network 700 is adapted for communication with user equipments (such as UE1 114A and UE2 114B), via a base station (such as a eNB 110). The network 700 may include infrastructure network control elements (not shown) that provide connectivity with the other network, such as a telephone network and/or a data communications network (e.g., the internet). The infrastructure network control elements can be organized in a basic structure and operate in a basic way well known to one skilled in the art. UE1 114A can establish a D2D communicate path 124 with UE2 114B. Furthermore, UE1 can establish an infrastructure communicate path 126 with UE2. Switch between these two kinds of communication path can be executed according to the exemplary embodiments of the present invention as discussed above.

The UE1 114A includes a data processor (DP) 710A, a memory (MEM) 710B that stores a program (PROG) 100C, and a suitable radio frequency (RF) transceiver 710D for bidirectional wireless communications with the eNB 120 via one or more antennas. In an exemplary embodiment, the transceiver 710D in the UE1 114A can be used for D2D communications in both licensed band (e.g. cellular band) and unlicensed band (e.g. WLAN band). Alternatively, the transceiver 710D can comprise separate components to support D2D communications in licensed band (e.g. cellular band) and unlicensed band (e.g. WLAN band) respectively.

The UE2 114B also includes a DP 720A, a MEM 720B that stores a PROG 720C, and a suitable RF transceiver 720D. In an exemplary embodiment, the transceiver 720D in the eNB 110 can be used for D2D communications in both licensed band (e.g. cellular band) and unlicensed band (e.g. WLAN band). Alternatively, the transceiver 720D can comprise separate components to support D2D communications in licensed band (e.g. cellular band) and unlicensed band (e.g. WLAN band) respectively.

The eNB 110 also includes a DP 740A, a MEM 740B that stores a PROG 740C, and a suitable RF transceiver 740D.

At least one of the PROGs 710C, 720C, 740C is assumed to include program instructions that, when executed by the associated DP, enable the electronic device to operate in accordance with the exemplary embodiments of this invention, as discussed above. That is, the exemplary embodiments of this invention may be implemented at least in part by computer software executable by the DP 720A of the UE1 114A, by the DP 720A of the UE2 114B, and by the DP 740A of the eNB 110, or by hardware, or by a combination of software and hardware. The basic structure and operation of UE1 114A, UE 114B and eNB 120 are known to one skilled in the art.

In general, the various embodiments of the UE1 114 and UE2 114B can include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 710B, 720B, 740B may be of any type suitable to the local technical environment and may be implemented using any suitable data storage technology, such as semiconductor based memory devices, flash memory, magnetic memory devices and systems, optical memory devices and systems, fixed memory and removable memory. The DPs 720A, 720A, 740A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

The invention claimed is:

1. A method, comprising:
determining, at a first device, to initiate a switch from a first communication path that is between the first device and a second device to a second communication path that is between the first device and the second device; and
in response to the determining,
transmitting, to a base station, a notification of the initiation of the switch, wherein the base station is configured to establish, in response to the notification, an intermediate communication path between the first device and the second device and
communicating with the second device via the intermediate communication path until the second communication path is established, wherein traffic delivered via the intermediate communication path is routed by the base station and bypasses a core network.

2. The method according to claim 1, further comprising:
in response to the determining to initiate the switch, transmitting, to the second device, a request for the second device to initiate the switch to the second communication path.

3. The method according to claim 1, wherein base station establishes the second communication path by at least reusing radio resources allocated for the intermediate communication path.

4. The method according to claim 2, further comprising:
receiving, from the second device, an acknowledgement of the request for the second device to initiate the switch to the second communication path; and
stopping to communicate with the second device via the first communication path.

5. The method according to claim 1, wherein the notification includes information indicating the initiation of the switch at the first device and an identity of the second device.

6. The method according to claim 1, wherein the notification includes information indicating a last data block to be transmitted to the second device via the first communication path.

7. The method according to claim 1, wherein the first communication path comprises a device-to-device communication path and the second communication path comprises an infrastructure communication path.

8. The method according to claim 1, wherein the determining is in response to a detecting, by the first device, of a deterioration in a radio link condition of the first communication path, and wherein the detecting is based on one or more of a signal strength, a bit error rate, and a distance between the first device and the second device.

9. An apparatus, comprising:
at least one processor; and
at least one memory including computer program code;
the at least one memory and the computer program code configured to, with the at least one processor, cause the apparatus to perform at least the following:
determine to initiate a switch from a first communication path that is between the apparatus and another apparatus to a second communication path that is between the apparatus and the other apparatus; and
in response to the determining,
transmit, to a base station, a notification of the initiation of the switch, wherein the base station is configured to establish, in response to the notification, an intermediate communication path between the apparatus and the other apparatus and
communicate with the other apparatus via the intermediate communication path until the second communication path is established, wherein traffic delivered via the intermediate communication path is routed by the base station and bypasses a core network.

10. The apparatus according to claim 9, the apparatus is further configured to:
in response to the determining to initiate the switch, transmit, to the other apparatus, a request for the other apparatus to initiate the switch to the second communication path.

11. The apparatus according to claim 9, wherein the base station establishes the second communication path by at least reusing radio resources allocated for the intermediate communication path.

12. The apparatus according to claim 10, the apparatus is further configured to at least:
receive, from the other apparatus, an acknowledge of the request for the other apparatus to initiate the switch to the second communication path; and
stop communicating with the other apparatus via the first communication path.

13. The apparatus according to claim 9, wherein the notification includes information indicating the initiation of the switch at the apparatus and the identity of the other apparatus.

14. The apparatus according to claim 9, wherein the notification includes information indicating a last data block to be transmitted to the other apparatus via the first communication path.

15. An apparatus, comprising:
at least one processor; and
at least one memory including computer program code,
the at least one memory and the computer program code configured to, with the at least one processor, cause the apparatus to perform at least the following:
determine to initiate a switch from a first communication path between a first device and a second device to a second communication path between the first device and the second device; and
in response to the determining,
establish an intermediate communication path between the first device and the second device, and
route traffic between the first device and the second device via the intermediate communication path until the second communication path is established, wherein the traffic routed via the intermediate communication path bypasses a core network.

16. The apparatus according to claim 15, wherein the apparatus is further configured to at least:
receive, from the first device, a notification to initiate the switch from the first communication path to the second communication path, wherein the determining to initiate the switch is based at least in part on the notification; and
in response to receiving the notification from the first device, send, to the second device, a request to initiate the switch.

17. The apparatus according to claim 15, wherein the apparatus is further configured to at least:
configure radio resources between the apparatus and each of the first device and the second device, wherein the configuring enables the radio resources to be used for the intermediate communication path and the second communication path.

18. The apparatus according to claim 15, wherein the apparatus is further configured to at least:
transmit, to the first device and/or the second device, a notification to stop waiting to receive traffic over the first communication path at a specified time, wherein the specified time is determined based on information related to a communication over the first communication path.

19. The apparatus according to claim 18, wherein the information related to the communication over the first communication path comprises at least one of the following:
information indicating the last data block to be transmitted from the first device to the second device via the first communication path, information indicating the last data block to be transmitted from the second device to the first device via the first communication path, and a max delay budget for the communication over the first communication path.

20. The apparatus according to claim 16, wherein the notification includes information indicating the initiation of the switch at the first device and an identity of the second device.

21. The apparatus according to claim 16, wherein the notification includes information indicating a last data block to be transmitted to the second device via the first communication path.

* * * * *